US008237806B2

(12) United States Patent
Tanaka et al.

(10) Patent No.: US 8,237,806 B2
(45) Date of Patent: Aug. 7, 2012

(54) PHOTOGRAPHIC SYSTEM

(75) Inventors: Ryuta Tanaka, Kawasaki (JP); Satoshi Sonobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 858 days.

(21) Appl. No.: 11/853,931

(22) Filed: Sep. 12, 2007

(65) Prior Publication Data

US 2008/0062267 A1  Mar. 13, 2008

(30) Foreign Application Priority Data

Sep. 13, 2006  (JP) .................. 2006-248105

(51) Int. Cl.
*H04N 5/232* (2006.01)
*H04N 5/225* (2006.01)

(52) U.S. Cl. .................. 348/211.99; 348/207.1

(58) Field of Classification Search .......... 348/345, 348/211.99, 207.1, 207.11, 211.1–211.14
See application file for complete search history.

(56) References Cited

U.S. PATENT DOCUMENTS

| 7,479,987 | B2 | 1/2009 | Watanabe et al. | |
| 2003/0043283 | A1 | 3/2003 | Yamamoto | |
| 2004/0046871 | A1 | 3/2004 | Ichikawa et al. | |
| 2004/0252223 | A1* | 12/2004 | Masuno et al. | 348/345 |
| 2006/0028558 | A1* | 2/2006 | Sato et al. | 348/211.99 |
| 2006/0158520 | A1 | 7/2006 | Funakura | |
| 2007/0237358 | A1* | 10/2007 | Tseng et al. | 382/103 |

FOREIGN PATENT DOCUMENTS

| JP | 2000-152217 | | 5/2000 |
| JP | 2001-136514 | | 5/2001 |
| JP | 2001-169175 | | 6/2001 |
| JP | 2001169175 | * | 6/2001 |
| JP | 2003-32589 | | 1/2003 |
| JP | 2004-40736 | | 2/2004 |
| JP | 2005-51552 | | 2/2005 |
| JP | 2006-13881 | | 1/2006 |
| JP | 2006-174195 A | | 6/2006 |

OTHER PUBLICATIONS

European Search Report dated Feb. 4, 2009, from the corresponding European Application.
Partial European Search Report dated Dec. 9, 2008, from the corresponding European Application.
Japanese Office Action mailed Oct. 25, 2011 for corresponding Japanese Application No. 2006-248105, with English-language Translation.

* cited by examiner

*Primary Examiner* — Chieh M Fan
*Assistant Examiner* — Akshay Trehan
(74) *Attorney, Agent, or Firm* — Fujitsu Patent Center

(57) ABSTRACT

A camera device capable of taking a commemorative image of an operator serving as a subject which includes a background image by a remote operation from an operation terminal held by the operator through a communication network, includes: a section that calculates a photographic target area based on position information of a camera section and state information of the camera section which includes at least one of a pan angle, a tilt angle, and a zoom magnification; a section that determines whether or not the operation terminal is located within the photographic target area based on terminal position information received from the operation terminal through the communication network and information indicating the calculated photographic target area; and a section that permits high-image quality photographing and enabling transmission of a video image subjected to high-image quality processing to the operation terminal through the communication network when it is determined that the operation terminal is located within the photographic target area.

10 Claims, 7 Drawing Sheets

PHOTOGRAPHIC SYSTEM

CROSS-REFERENCE TO RELATED APPLICATIONS

This application is based upon and claims the benefit of priority of the prior Japanese Patent Application No. 2006-248105, filed Sep. 13, 2006, the entire contents of which are incorporated herein by reference.

BACKGROUND OF THE INVENTION

The present invention relates to a photographic system capable of controlling a video quality of a camera device connected to a communication network based on a position of an operation terminal, and more particularly, to a technique capable of controlling a fixed camera device serving as a live camera by a remote operation from an operation terminal held by an operator, which is a person to be photographed through the communication network to take a commemorative image of the operator, which includes a background image without infringing on the portrait rights of others.

When commemorative photographing is to be performed by a handheld camera, it is obvious that a camera is directed to a subject by a photographer. In this case, a third person who exists around the subject and does not like to be photographed leaves the place or turns the face in the direction so that his face cannot be photographed. Such a slight action can avoid the person being photographed. In addition, the action is conventionalized. As a result, there is generally no case where the action leads to a problem of infringement on the portrait right, which includes the right to refuse photographing and the right to refuse the use of images. The right to refuse photographing is a right that a portrait image of a person is not taken without permission of the person. The right to refuse the use of images is a right that the taken portrait image is not freely released by another person.

In recent years, one of use examples of a live camera that becomes popular is a service (broadband service), in which the images of tourist spots are taken at a visually valuable angle and distributed for tourist use.

The distributed images in the service are used for the case where video users (users) located in remote places obtain various real time information including weather information or congestion state information, and flowering information on cherry blossoms and colored leaves on the tourist spots and their vicinities where cameras are placed. The images are normally distributed with a suitable quality within a range in which the portrait right of a person located in an area to be photographed is not infringed.

With respect to such video images taken by the live cameras, locations where the cameras are placed and camera angles thereof are important. Therefore, when an image of a person traveling to a tourist spot can be taken (by self-photographing) together with a scene (background) with an improved image quality, high-value commemorative photographs clearly different from photographs that taken by the handheld camera can be obtained. In contrast to this, placing a camera at an angle for obtaining high-value commemorative photographs in a tourist spot and commonly using the placed camera as the live camera, is effective as a camera use method.

However, when high-resolution photographing, which can be used for commemorative photographing is performed by a photographic system using the live camera or the like, it becomes necessary to technically avoid the infringement on both the right to refuse photographing and the right to refuse the use of images, which are the portrait rights, so this causes a problem.

In the photographic system for self-photographing, it is effective that a mobile terminal such as a mobile telephone whose function is being improved is used as means that controls the live camera (fixed camera) or checking a video image from the view points of a widespread state of the mobile terminal and user's operational experiences.

However, in a photographic system for self-photographing using the mobile terminal, the mobile terminal can access the network from any place and camera control can be performed from remote places for photographing except the self-photographing. Therefore, according to a related unlimited access authorization method or a related unified access authorization method for registered users, a specified person in the field of view of the fixed camera can be viewed by the general public or third persons, so it is liable to infringe the portrait right (right to refuse the use of images). When the fixed camera is located at a distance from a position where the subject stands, it is liable to infringe the portrait right (right to refuse photographing) of a person who enters the field of view of the camera without knowing to be photographed.

When a photographic system for self-photographing, in which the fixed live camera which is connected to a communication network such as the Internet and can be operated by remote control is used, and commemorative self-photographing is performed at an angle at which photographing cannot be performed by a handheld camera (for example, an angle from the fixed live camera, which is provided at a higher place such as the top of a surrounding building) is to be studied, the following related techniques can be listed.

(1) In an image information transmitting and receiving system described in JP 2004-40736 A, when a subject-operator holding a terminal moves closer to a photographic spot of a camera, the operator permits self-photographing while viewing a preview image.

According to this technique, a person who enters the field of view of the camera without knowing to be photographed is photographed together with the operator, so the infringement on the portrait right (right to refuse photographing) cannot be avoided.

According to this technique, when the subject-operator enters the vicinity of a photographic target area, a photographic operation can be performed. However, there is no mechanism for controlling a quality against access from the outside of the photographic target area, so a specific photographic system for only the photographic target area has to be provided.

There is no system in which a mechanism for determining the position of the subject-operator is operated in conjunction with, for example, a zoom function of the camera. Therefore, it is difficult to improve the determination precision as to whether or not the subject enters the photographic target area while the free operation of the camera is permitted.

(2) According to a technique described in JP 2005-51552 A, a mechanism for sending a notice indicating that the photographing is performed by a remote operation to the surroundings of a remote operatable camera is provided. Therefore, a person close to the camera can be prevented from being photographed without knowing to be photographed.

However, in the case where the distant camera is to be controlled for self-photographing, even when a notice indicating photographing is sent to the surroundings of the distant camera, an effect is not obtained.

(3) According to a technique described in JP 2001-136514 A, a part of an image taken by a network camera is subjected to low-resolution conversion to protect the right of a subject. However, there is no image quality control mechanism corresponding to a user accessing the camera, with the result that photographs obtained by performing the low-resolution conversion on the part of the image are not suitable as commemorative photographs for a user performing self-photographing.

A relationship between each position and the photographic target area is changed by the movement of an operation terminal, the movement of a third person in the photographic target area, or the operation of the camera. Therefore, it is difficult to apply a method of determining an image region of the part subjected to the low-resolution conversion by the operator to a target except a fixed target.

(4) According to an album preparation support system described in JP 2003-32589 A, when image pickup is performed by a multimedia terminal including an image pickup section and an obtained image is combined with a different related image, an album can be prepared. When a background of a person is removed at the time of image combination, a composite photograph that does not show a third person is realized.

Although this technique is used for performing background replacement and combination processing to obtain the composite photograph that does not show the third person, the composite photograph is not suitable as a commemorative photograph for remembering the situation.

The following are related arts to the present invention.
[Patent document 1] Japanese Patent Laid-Open Publication No. 2004-40736 (JP 2004-40736 A)
[Patent document 2] Japanese Patent Laid-Open Publication No. 2005-51552 (JP 2005-51552 A)
[Patent document 3] Japanese Patent Laid-Open Publication No. 2001-136514 (JP 2001-136514 A)
[Patent document 4] Japanese Patent Laid-Open Publication No. 2003-32589 (JP 2003-32589 A)

SUMMARY OF THE INVENTION

An object of the present invention is to provide a technique capable of taking a commemorative image of an operator that includes a background image without infringing on the portrait rights of others.

In order to solve the problems, according to the present invention, there is provided a first camera device capable of taking a commemorative image of an operator serving as a subject, which includes a background image by a remote operation from an operation terminal held by the operator through a communication network, the first camera device including:

a section that calculates a photographic target area based on position information of a camera section and state information of the camera section which includes at least one of a pan angle, a tilt angle, and a zoom magnification;

a section that determines whether or not the operation terminal is located within the photographic target area based on terminal position information received from the operation terminal through the communication network and information indicating the calculated photographic target area; and a section that permits high-image quality photographing and enabling transmission of a video image subjected to high-image quality processing to the operation terminal through the communication network when it is determined that the operation terminal is located within the photographic target area.

In the structure of the first camera device, the first camera device may further include a section that performs control as to whether photographing from the operation terminal with an image quality limit state is permitted or access therefrom is inhibited when it is determined that the operation terminal is located outside the photographic target area.

In addition, the first camera device may further include a section that applies one of resolution reduction processing, luminance or color tone reduction processing, and frame rate reduction processing when the photographing with the image quality limit state is permitted.

According to the present invention, there is provided a second camera device which can be remote-operated from an operation terminal held by an operator through a communication network, the second camera device including:

a quality control section that controls a quality of a video image provided for the operation terminal based on a relative position obtained from terminal position information received from the operation terminal through the communication network and camera position information of a camera section.

A third camera device according to the present invention further includes, in the structure of the second camera device, an access control section that controls access permission to the operation terminal based on the relative position obtained from the terminal position information and the camera position information.

In the structure of the second camera device or the third camera device, the second camera device or the third camera device may further include a section that limits an operation area of the camera section to prevent video quality change between a high-image quality permission state and an image quality limit state by an operation of the camera section or prevent an access permission state from being changed by the operation of the camera section.

In addition, in the structure of the second camera device or the third camera device, the second camera device or the third camera device may further include a section that continues to control a state of the camera section to prevent video quality change between a high-image quality permission state and an image quality limit state by a movement of the operation terminal or prevent an access permission state from being changed by the movement of the operation terminal.

In addition, in the structure of the second camera device or the third camera device, the second camera device or the third camera device may further include a section that sends a notice indicating an action of one of the operation terminal and a notification device which is separately provided to a surrounding in advance or continuously when the camera section is operated.

According to the present invention, a high quality is set for a commemorative image obtained by self-photographing (commemorative photographing) and a limited image quality is set for the other cases, so it is possible to provide a photographic service based on quality control suitable for each user. A notice indicating photographing can be certainly sent to surroundings. When the camera automatically follows the movement of the operation terminal or when the action of the camera that is caused by the operation therefor is limited, a high-image quality photographic service can be maintained.

As a result, a problem on the portrait right that is a conventional problem with respect to the high image quality of a live camera can be cleared. When the problem on the portrait right is avoided, it is possible to increase the image quality of the live camera and realize both a commemorative photographing service and a conventional live camera photographing service.

Other objects, features, and advantages of the present invention will become apparent upon reading the following specification (embodiments) taken together with the accompanying drawings and claims.

DETAILED DESCRIPTION OF THE PREFERRED EMBODIMENTS

Hereinafter, the present invention will be described in more detail with reference to the attached drawings. The drawings show preferred embodiments of the present invention. However, the present invention can be embodied in many different modes and thus it should not be construed that the present invention is limited to embodiments described in this specification. The embodiments are thoroughly and completely disclosed in this specification and provided to sufficiently convey the scope of the present invention to a person skilled in the art.

[System Structure and Function]

Figure 1:
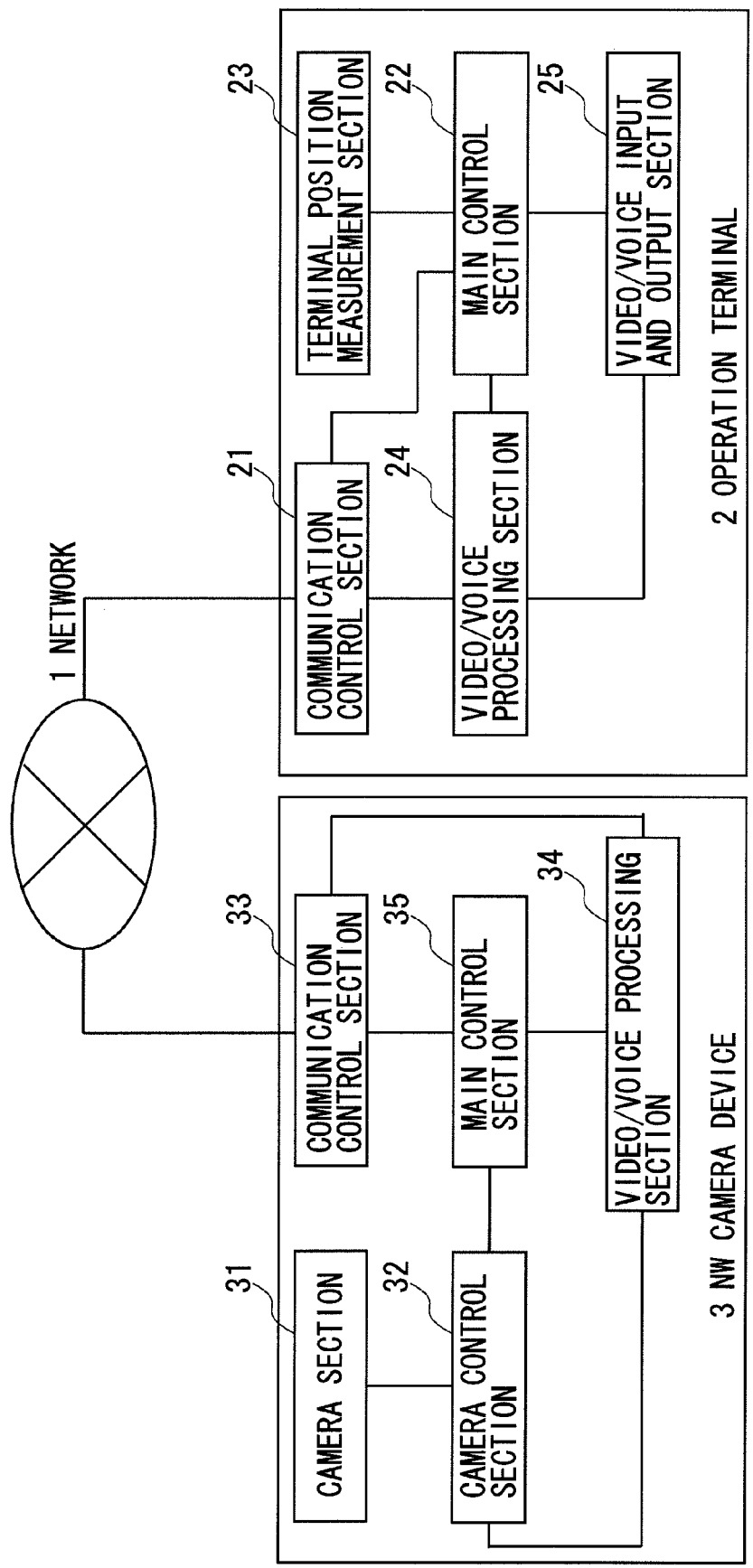
FIG. 1 is a block diagram showing a structure of a photographic system according to an embodiment of the present invention.

Referring to FIG. 1 showing a structure of a system in an embodiment of the present invention, a photographic system SYS is a photographic system for self photographing which is capable of controlling a network (NW) camera device 3 serving as a remote operatable fixed live camera (fixed camera) which is connected with a communication network 1 such as the Internet by a remote operation from an operation terminal 2 serving as a mobile terminal which is held by an operator which is a subject, to take a commemorative image of the operator which includes a background image.

The operation terminal (hereinafter also merely referred to as a terminal) 2 includes a communication control section 21, a main control section 22, a terminal position measurement section 23, a video/voice processing section 24, and a video/voice input and output section 25 in addition to functions for a mobile telephone.

The NW camera device (hereinafter also merely referred to as a camera) 3 includes a camera section 31, a camera control section 32 capable of controlling the pan, tilt, zoom, photographing, etc. of the camera section 31 and obtaining state information of the camera section 31, a communication control section 33, a video/voice processing section 34, and a main control section 35 for performing image quality control, access control, instructions, and the like to the respective sections.

According to the photographic system SYS, a problem of infringement on the portrait right including both the right to refuse photographing and the right to refuse the use of images, which is caused by a photographic service with the same video image quality, in the case of an operation from the operator (user) which is the subject holding the operation terminal 2 to the NW camera device 3 and the case of an operation from a user who wants to view video images from remote places by the operation terminal 2 held by the user through the NW camera device 3 serving as a live camera, is solved by the following method.

When the user performs a camera operation from the operation terminal 2 to the NW camera device 3, the operation terminal 2 transmits terminal position information and an error parameter which are measured by the terminal position measurement section 23 from the communication control section 21 to the NW camera device 3 through the communication network 1 under the control of the main control section 22 having specific application software including a global positioning system (GPS) position measurement function and a live camera control function.

The terminal position measurement section 23 can perform high-precision position measurement using the GPS function, a differential GPS (DGPS) function, or a position measurement function similar thereto and transmit the terminal position information to the NW camera device 3 together with the error information (error parameter) based on the limit of a mounted position measurement system.

In the NW camera device 3, the main control section 35 calculates a photographic target area for the camera based on current position information of the camera section 31 which is obtained from the camera controls section 32 and state information including pan/tilt angles and a zoom magnification or the like, of the camera section 31 and determines whether or not the operation terminal 2 is located (exists) within the photographic target area in view of the terminal position information and the error parameter which are received from the operation terminal 2 through the communication control section 33 and information indicating the calculated photographic target area.

When the main control section 35 determines that the operation terminal 2 is located within the photographic target area, the main control section 35 permits high-quality photographing and viewing and transmits a video image (photo) subjected to high-quality image processing by the video/voice processing section 34 to the operation terminal 2 through the communication control section 33.

On the other hand, when the main control section 35 determines that the operation terminal 2 is located outside the photographic target area, the main control section 35 performs the control as to whether photographing and viewing from the operation terminal 2 with a suitably limited image quality are permitted or the access therefrom is inhibited.

With respect to quality control, when the image quality is to be limited, the video/voice processing section 34 performs resolution reduction processing, luminance or color tone reduction processing, or frame rate reduction processing based on instructions from the main control section 35.

The video/voice processing section 34 performs not only the quality conversion based on the instructions from the main control section 35 but also video coding suitable for network transfer. Normal coding methods include a moving picture compression method such as a moving picture experts group (MPEG) method or an H.264 method and an image compression method such as a joint photographic experts group (JPEG) method and can be employed as appropriate.

Next, according to the photographic system SYS, a problem of infringement on the right to refuse photographing is solved by the following method.

When the operation terminal 2 is within the photographic target area of the NW camera device 3, the video/voice input and output section 25 of the operation terminal 2 sends, to the surroundings of the operation terminal 2, by a voice, video, or light notice indicating a camera status, that is, a photographing state which is obtained by the main control section 22 through communication with the NW camera device 3. When a separate notification device having the same notification function is provided, the notice can be more certainly sent to the surroundings of the operation terminal 2.

A high notification effect is obtained by sending the light notice. However, a problem that a video image reflects light occurs. Therefore, a shutter operation of the NW camera device 3 is synchronized with a light emission operation of the operation terminal 2 or the notification device and the light notice is stopped at the time of photographing, so unnecessary reflection on a commemorative video image can be prevented.

Further, according to the photographic system SYS, with respect to a commemorative photograph value loss problem caused by a method of avoiding the infringement on the portrait right by partial resolution reduction or image combination, whether or not commemorative photographing of self-photographing is performed is determined by the determination function of the main control section 35 of the NW camera device 3 as to whether or not the operation terminal 2 is located within the photographic target area. When the operation terminal 2 is located within the photographic target area, high-quality photographing is performed without any change.

SPECIFIC OPERATIONAL EXAMPLES OF SYSTEM

Next, specific operational examples of the photographic system SYS according to the embodiment of the present invention as shown in FIG. 1 will be described with reference to FIGS. 1 to 5.

Operational Example 1

Assume that the operation terminal 2 is a mobile telephone that is widely used in recent years and has a GPS function. The mobile telephone contains specific application software having a network communication function, a GPS position measurement function, an image display and voice output function, a recording function, a live camera control function, and the like.

When a commemorative photograph is to be taken in the photographic target area of the NW camera device 3 serving as the live camera, the operator (user) key-inputs, from the operation terminal 2, a camera address described in a signboard or a service informational sign which is set in the vicinity of the area to perform the access to NW camera device 3 through the communication network 1. The camera address may be inputted as a two-dimensional code (two-dimensional bar code) and the like using a camera function of the mobile telephone. When an identification procedure and the like are performed by the main control section 35 of the NW camera device 3 as needed to establish communication between the operation terminal 2 and the NW camera device 3 through the communication network 1, control changes to a quality determination procedure.

Upon an acquisition request of the terminal position information from the NW camera device 3, the cooperation among the communication control section 21, the main control section 22, and the terminal position measurement section 23 is made. Then, the operation terminal 2 starts the GPS position measurement and transmits error information (radius "e" of an error area) corresponding to precision on position measurement data and a position measurement method to the NW camera device 3.

To simplify the description, a two-dimensional coordinate system in which the operation terminal 2 and the NW camera 3 are viewed from the top will be described.

Figure 2:
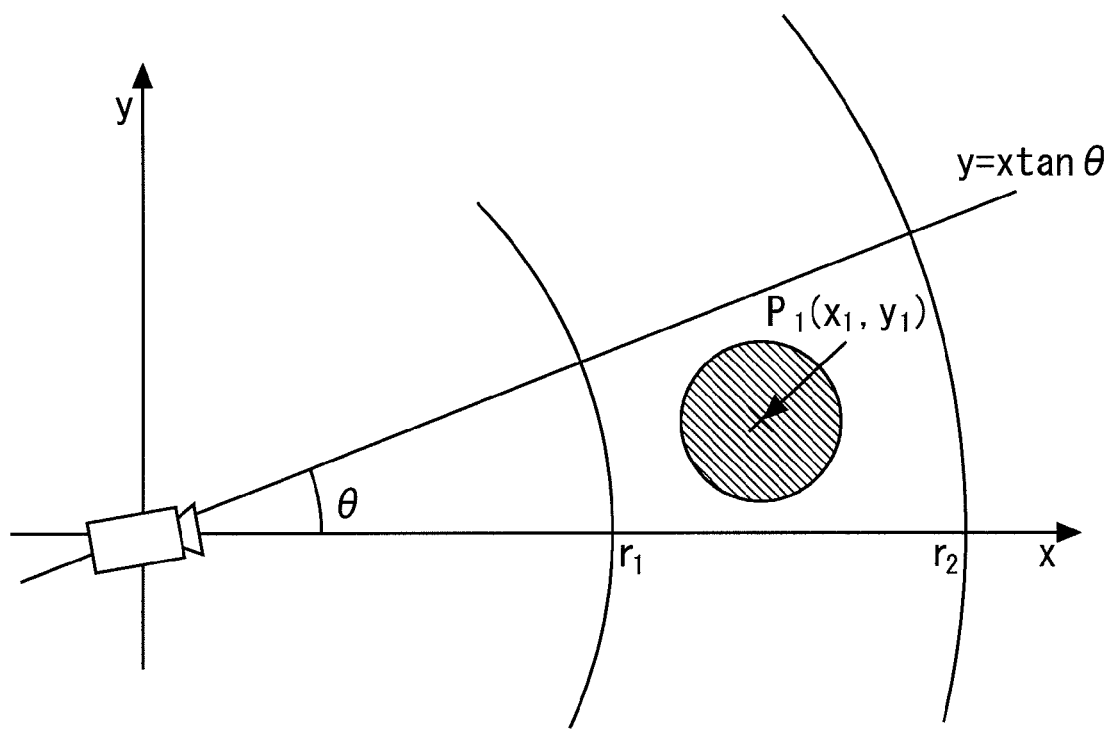
FIG. 2 is an explanatory view showing a fundamental expression for a positional relationship between an NW camera device and an operation terminal.

As shown in FIG. 2, a right side of a camera view angle $\theta$ of the NW camera device 3 is taken on an x-axis and a camera position is set to the origin of an x-y coordinate system. An orientation (including a pan angle and a tilt angle in a three-dimensional case) of the camera section 31 corresponds to $\theta/2$. When "e" indicates a radius of a position measurement error area, a terminal position $p_1(x_1, y_1)$ of the operation terminal 2 is within a range expressed by Expression 1.

$$x-x_1)^2+(y-y_1)^2 \leq e^2 \qquad \text{(Expression 1)}$$

On the other hand, when the camera view angle is expressed by $\theta$ as shown in FIG. 2, the photographic area of the camera section 31 is expressed by Expression 2.

$y \geq 0$ and
$y \leq x \tan \theta$ and $$r_1^2 \leq x^2+y^2 \leq r_2^2 \qquad \text{(Expression 2)}$$

where $r_1$ and $r_2$ indicate a minimum photographic distance and a maximum photographic distance, respectively. An area suitable for commemorative photographing may be set based on camera performance, lens performance, zoom magnification, and the like.

When Expression 1 and Expression 2 are solved and a terminal position area including an error is within a range of the camera view angle $\theta$, the commemorative photographing of self-photographing can be determined and thus a quality control state for high-image quality permission is set.

On the other hand, when the terminal position area including the error is outside a photographic range of the camera view angle $\theta$ (outside the photographic target area) or intersects with a camera view angle boundary (see FIG. 3A), the swing (pan) movement in the camera direction is made so as to locate the operation terminal 2 within the photographic range (photographic target area) without intersecting with the boundary. The swing of the NW camera device 3 (strictly speaking, the swing of the camera section 31) is relatively equivalent to rotational movement of a coordinate $p_2(x_2, y_2)$ of the terminal position. Hereinafter, the rotation of the coordinate of the terminal position is shown.

A swing angle of the camera section 31 (rotational movement angle of the operation terminal 2) is calculated by Expression 3. In other words, an angle $\theta m$ for moving the coordinate $p_2(x_2, y_2)$ of the terminal position to the middle of the current camera view angle $\theta$ is obtained by Expression 3.

$$\theta_m = \tan^{-1} \frac{y_2}{x_2} - \frac{\theta}{2} \qquad \text{(Expression 3)}$$

When counterclockwise swing (pan) of the angle $\theta m$ can be made, the camera section 31 is swung by the camera control section 32, so a high-image quality permission state is set. On the other hand, when the swing cannot be made, the camera section 31 is swung by a maximum angle $\theta m'$ by which it is swingable at this time. In order to receive high-quality permission, a necessary remaining movement angle ($\theta m-\theta m'$) is converted into an orientation and a distance 1 and a notice is sent to the operation terminal 2. Then, a low-image quality limit state or an access inhibition state is set.

In the operation terminal 2, the video/voice input and output section 25 sends a video or voice notice indicating the distance l and the orientation to a terminal operator. When the high-image quality permission is necessary, the terminal operator may move based on the notice information.

Figure 3A:
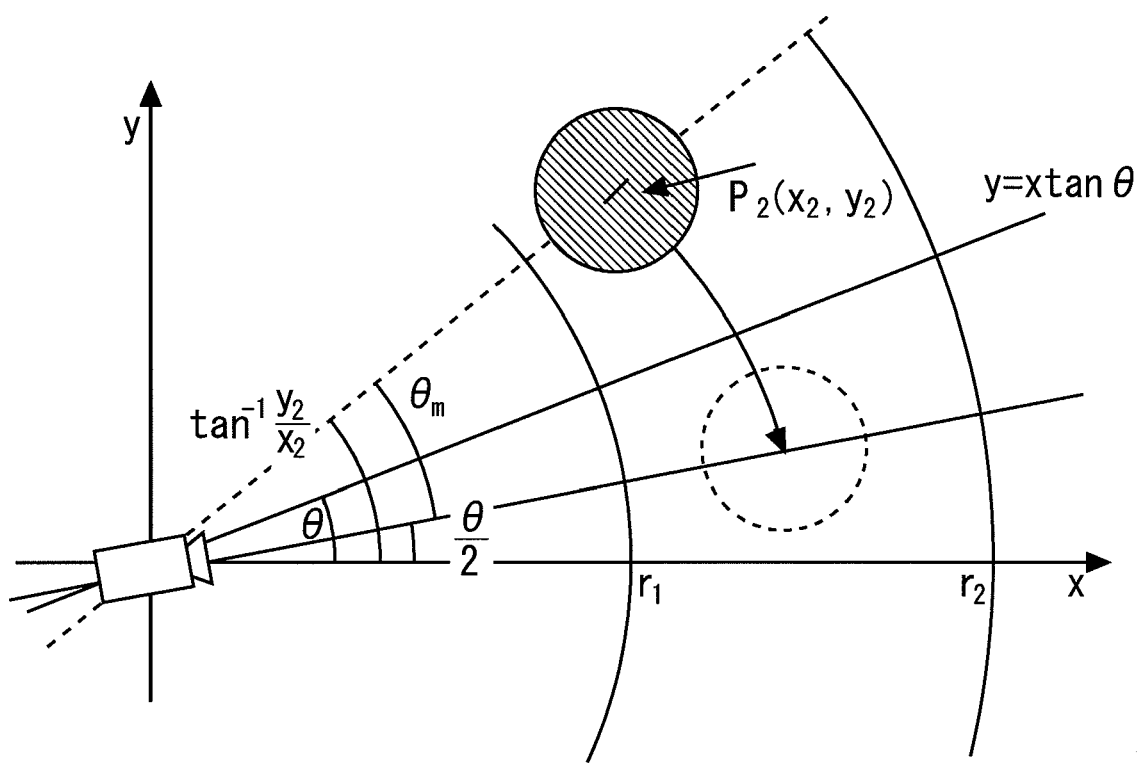
FIG. 3A is an explanatory view showing control for moving the operation terminal into a photographic area.
Figure 3B:
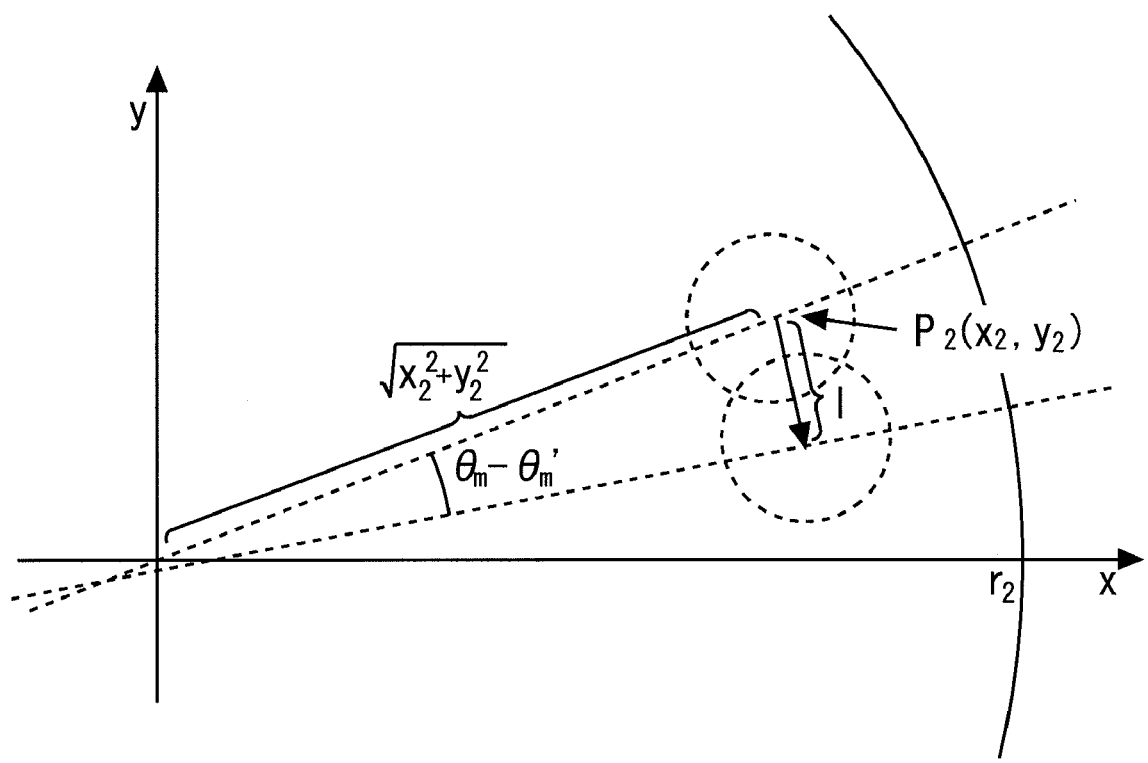
FIG. 3B is an explanatory view to calculate a moving distance of the operation terminal in the case where a state can be changed to a high-image quality state.

The moving distance l is calculated by Expression 4 (see FIG. 3B).

$$l = 2\sqrt{x_2^2 + y_2^2} \sin\frac{\theta_m - \theta'_m}{2}$$ (Expression 4)

Figure 3C:
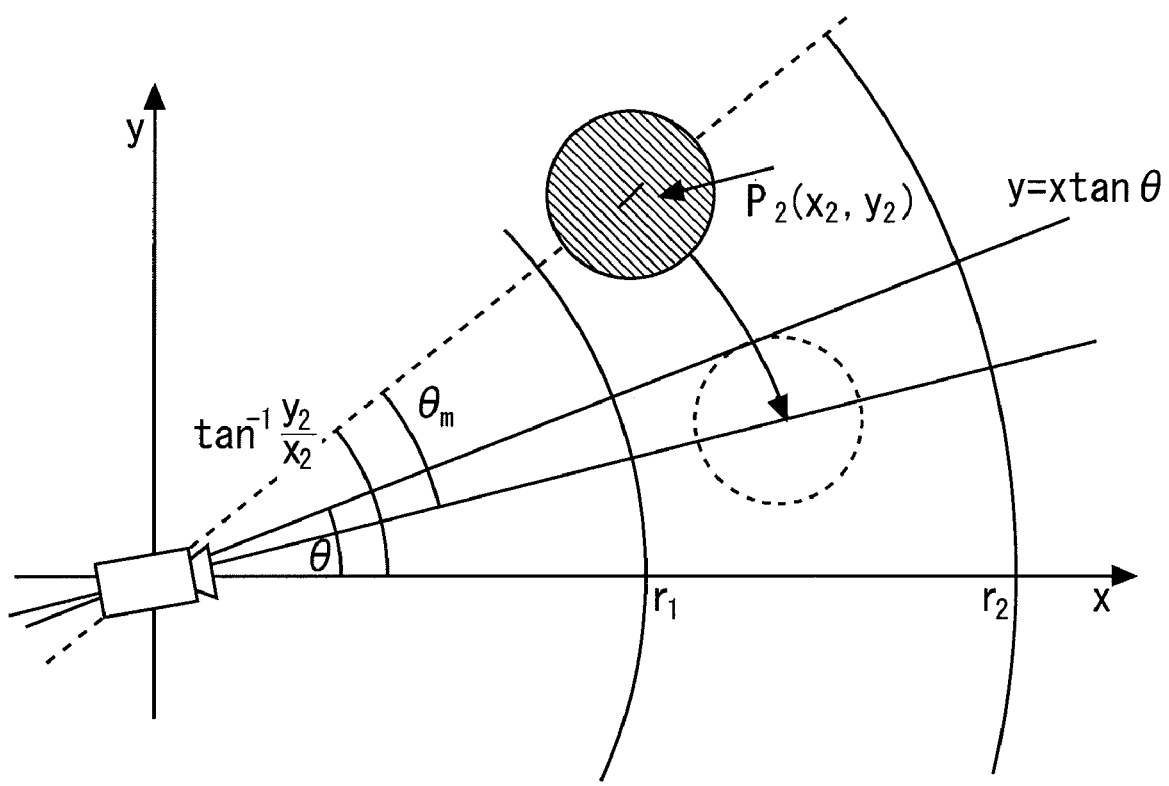
FIG. 3C is an explanatory view showing minimum movement for moving the operational terminal into the photographic area.

As shown in FIG. 3A, the angle θm may be not a moving angle to the middle of the view angle θ but a minimum angle at which high-image quality permission is possible (see FIG. 3C). The described procedure is the fundamental procedure in which the main control section 35 of the NW camera device 3 determines whether or not the operation terminal 2 is within the photographic range by the cooperation among other constituent elements to perform quality determination.

Figure 4:
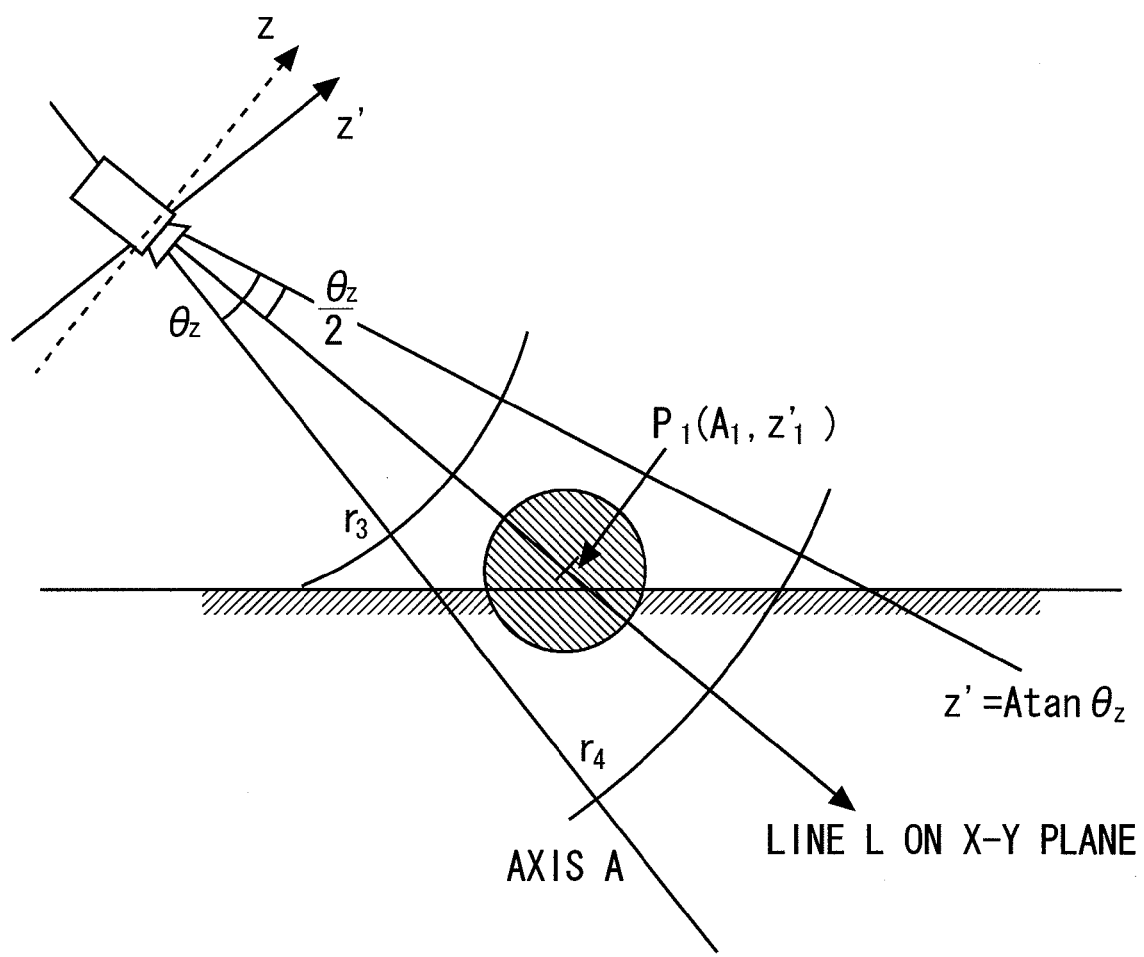
FIG. 4 is an explanatory view in the case of three-dimensional determination.

The described example is the two-dimensional example. A height may be also taken into account. That is, a tilt operation of the camera section 31 may be taken into account to perform three-dimensional determination. In this case, an example is shown in FIG. 4, in which a straight line passing through two points, the camera section 31 and the terminal position $p_1(x_1, y_1)$ is expressed by L and a plane which includes the straight line L and is perpendicular to the x-y plane is considered. An axis followed by rotating a z-axis perpendicular to the x-y plane by −θz/2 on an L-z plane is defined as a z'-axis. Similarly, an axis followed by rotating the straight line L by −θz/2 on the L-z plane is defined as an A-axis. Therefore, the same two-dimensional determination can be performed on an A-z' plane.

In FIG. 4, θz denotes a view angle of the camera section 31 in a longitudinal direction. The subsequent two-dimensional description can be extended to three-dimensional description in the same manner. In addition, $r_1$, $r_2$, and θ are parameters changed by a camera zoom operation, so the parameters may be dynamically changed.

After the quality is determined and the connection is established, the operation terminal 2 obtains a video image from the NW camera device 3 and displays the obtained video image. The operator can further perform the camera operation while viewing the video image.

Operation Example 2

Figure 5:
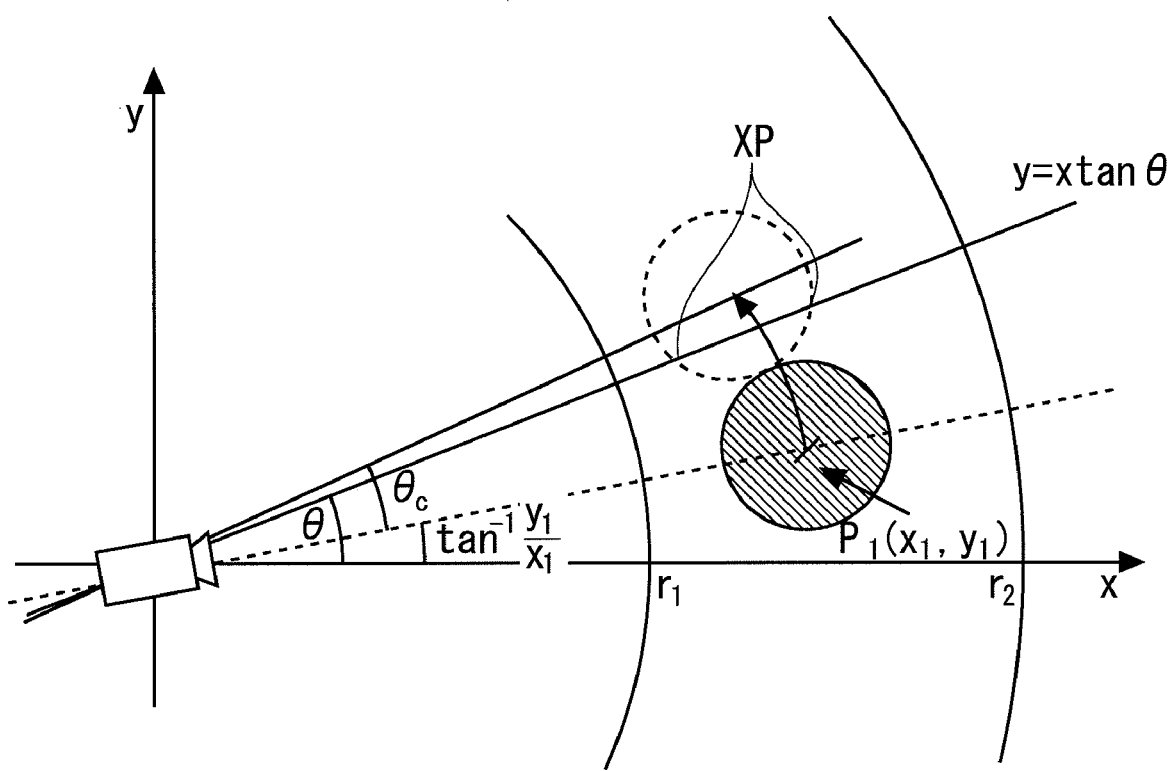
FIG. 5 is an explanatory view showing swing operation control of a camera section.

When an instruction for a camera pan operation of a swing angle θc is sent from the operation terminal 2 to the NW camera device 3, before the camera rotation control performed by the camera controls section 32 and the main control section 35, the main control section 35 determines the position after the rotation operation (see FIG. 5).

$$0 < \tan^{-1}\frac{y_1}{x_1} + \theta_c < \theta$$ (Expression 5)

For example, when the condition of Expression 5 is satisfied and it can be determined that there are no intersection points XP based on a result obtained by distance determination on an area circle of the operation terminal 2 and boundary lines of the camera view angle θ, the high-image quality permission state may be set. When this is not satisfied, the image quality limit state is set. When the current state is the high-image quality permission state and the quality state determined after the rotation becomes the image quality limit state, the swing is performed at a maximum angle capable of maintaining the high-image quality permission state and a notice indicating that a further operation causes the limit of the image quality is sent to the operation terminal 2. When the current state is the image quality limit state and the quality state determined after the rotation can be changed to the high-image quality permission state, such a notice is sent to the operation terminal 2. Then, the high-image quality permission state is automatically set or the state switching is performed in response to the confirmation from the operation terminal 2. When the state switching is refused by the operation terminal 2, it may be unnecessary to perform the state switching. When it is determined that a rotation instruction in which the state does not change is received, the swing operation is still performed.

Operational Example 3

The position information of the operation terminal 2 is constantly updated while the communication between the operation terminal 2 and the NW camera device 3 is being established. In the NW camera device 3 (main control section 35), when the movement of the operation terminal 2 is detected, the position and the quality are determined. When the position is within a range in which the state does not change, the state is maintained.

On the other hand, when it is determined that the state is changed from the high-quality permission state to the image quality limit state, the state is maintained by the swing of the camera section 31. A swing angle of the camera section 31 to maintain the high-quality permission state may be an angle corresponding to θm of FIG. 3A or FIG. 3C.

When the swing instruction of the camera section 31 and the movement of the operation terminal 2 simultaneously occur, the combined calculation and determination are desirably performed. When it is determined that the state is the image quality limit state at the time of quality determination in some cases including a first connection case, the access may be refused.

With respect to the quality control, in the high-image quality permission state, video resolution, a frame rate, and a gray level are increased to maximum values of camera performance to permit high-image quality photographing. On the other hand, in the image quality limit state, the video resolution, the frame rate, and the gray level are reduced for limitation. Therefore, the state in which a subject in a video image cannot be determined or it is very difficult to determine the object is maintained, thereby preventing the infringement on the portrait right.

Operational Example 4

While the commemorative photographing of self-photographing determined by the NW camera device 3 and the operation terminal 2 held by the operator which becomes the subject is connected with the NW camera device 3 with the high-image quality permission state, a voice or sound notice indicating a camera status including a camera state and an operation status is constantly audibly sent to the surroundings of the operation terminals 2. The camera status includes the fact that the camera section 31 is operated to face the operator, a size of the photographic target area, and the number of seconds between the time a photographic instruction operation is performed and the time photographing is performed. Further, a notice indicating a photographic preparation state or a photographic change state is visually sent to the surroundings by light emission display or blinking display in the operation terminal 2.

For example, the photographic target area is a circular area that includes the target area (see Expression 2 and FIG. 2) calculated by the NW camera device 3 and has the operation terminal 2 at the center. A notice indicating that approximately how long in meters the radius of the photographing target including the operation terminal 2 at the center is sent.

An electric signboard or a laser illumination device may be provided in the photographic target area and controlled by the NW camera device 3 serving as the live camera and then a notice indicating the photographic state and the photographic range may be sent to the surroundings. In the case of the light notice, in order to prevent the reflection at the time of photographing, light display is stopped several seconds before photographing in synchronization with photographing. After the lapse of several seconds from the photographing, the display is restarted. Such control is performed by the main control section 35 of the NW camera device 3. The electric signboard or the laser illumination device is controlled through the network communication.

In order to send the notice indicating the photographic target area to the surroundings, an electric system may be provided close to the photographic target area. Even in such a case, the main control section 35 of the NW camera device 3 may control the electric system through the network communication and generates the notice indicating the photographic state and the photographic range by synchronization control.

Operational Example 5

The video/voice input and output section 25 of the operation terminal 2 records a surrounding sound around the terminal at the time of photographing or before and after photographing based on settings of the operator. The main control section 22 of the operation terminal 2 sends the recorded surrounding sound to the NW camera device 3 through the network 1.

The NW camera device 3 transmits a set of photographic video data and the surrounding sound to the operation terminal 2 or causes a server (not shown) connected with the network 1 to store the set thereof. Instead of this, the photographic video data sent from the NW camera device 3 through the network 1 and the surrounding sound recorded by the operation terminal 2 may be combined with each other by the video/voice processing section 24 of the operation terminal 2 and then viewed or stored. In the NW camera device 3, a sound recorded therearound and the surrounding sound sent from the operation terminal 2 may be superimposed on each other by the video/voice processing section 34.

Modified Example

Modified examples of the specific operational examples may be as follows. The photographic video data taken by the NW camera device 3 is transferred together with information of the user operating the operation terminal 2 from the NW camera device 3 to a storage server (not shown) through the network 1 and data of the same user which is photographed at a plurality of locations are collected through the network 1 to unify the management for each user. The plurality of data may be transferred to an album edit server (not shown) and processed for users in a photograph binding album form or a digital album form to perform distribution (sale).

When an album is produced by the album edit server, suitable data may be selected from a database server (not shown) in which data including each tourist guide information, the origins of historical places, and histories are collected, based on position information of photographic points and described materials as in album pages to improve the value of the album. A tourist spot map may be described in an album and point information of cameras used for photographing may be marked as a trail on the map to improve the value of a commemorative travel album.

The taste of a user may be analyzed based on the trail thereof to describe next recommended travel plans or describe the related advertisements in, for example, a final page of the album. When advertising incomes are obtained, an album unit price may be reduced.

A printer having a function of connecting with the network 1 may be provided close to the photographic target area to be able to rapidly generate photographic video images as photographs in this place.

The processings in the embodiments are made by programs that can be executed by a computer. The programs can be provided from a recording medium such as a CD-ROM or a flexible disk and through a communication line.

Arbitrary plural processings or all processings in the embodiments can be embodied by selection and combination.

The disclosure of Japanese Patent Application No. JP2006-248105 filed on Sep. 13, 2006 including the specification, claims, drawings and abstract is incorporated herein by reference in its entirety.

What is claimed is:

1. A camera device capable of taking an image of an operator serving as a subject by a remote operation from an operation terminal operated by the operator through a communication network, comprising:

a first control section operable in a high-image quality state to permit high-image quality photographing from the operation terminal and enable transmission of a photographed video image subjected to high-image quality processing to the operation terminal through the communication network when it is determined that the operation terminal operated for photographing by the operator serving as the subject is located within a photographic target area based on a relative position obtained from terminal position information received from the operation terminal through the communication network and camera position information of a camera section; and a second control section operable in a low-image quality state to permit photographing from the operation terminal with a low-image quality by limiting resolution and enable transmission of a photographed video image subjected to low-image quality processing to the operation terminal through the communication network when it is determined based on the relative position obtained from the terminal position information received from the operation terminal through the communication network and the camera position information that the operation terminal operated for photographing by the operator serving as the subject is located outside the photographic target area.

2. A camera device according to claim 1, wherein the first control section or the second control section calculates the relative position in further view of state information of the camera section which includes at least one of a pan angle, a tilt angle, and a zoom magnification.

3. A camera device according to claim 1, wherein the first control section or the second control section changes the frame rate and controls one of resolution, a luminance or a color tone to perform quality control.

4. A camera device according to claim 1, further comprising:
a section to limit an operation area of the camera section to prevent video quality change between a high-image quality permission state and the low-image quality by limiting resolution by an operation of the camera section or prevent an access permission state from being changed by the operation of the camera section.

5. A camera device according to claim 1, further comprising:
a section to continuously control a state of the camera section to prevent video quality change between a high-image quality permission state and the low-image quality by limiting resolution by a movement of the operation terminal or prevent an access permission state from being changed by the movement of the operation terminal.

6. A camera device according to claim 1, further comprising:
a section to send a notice indicating an action of one of the operation terminal and a notification device which is separately provided to a surrounding in advance or continuously when the camera section is operated.

7. A camera device according to claim 6, wherein the notice from the operation terminal or the notification device to the surrounding is a visual notice based on one of a character, a video image, and light, or an audio notice based on one of a voice and a sound.

8. A camera device according to claim 7, wherein stop control is performed to prevent the visual notice from being reflected on a photographic video image.

9. A camera device according to claim 1, wherein a sound recorded by the operation terminal at a time of photographing or before and after photographing can be stored together with photographic video data of the camera device.

10. A camera device according to claim 9, wherein the sound recorded by the operation terminal can be superimposed on a surround sound of the camera device and stored together with the photographic video data.

* * * * *